US012588104B2

(12) United States Patent
Wang

(10) Patent No.: US 12,588,104 B2
(45) Date of Patent: Mar. 24, 2026

(54) METHOD, DEVICE AND COMPUTER READABLE MEDIUM FOR COMMUNICATIONS

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 584 days.

(21) Appl. No.: 17/925,780

(22) PCT Filed: May 20, 2020

(86) PCT No.: PCT/CN2020/091364
§ 371 (c)(1),
(2) Date: Nov. 16, 2022

(87) PCT Pub. No.: WO2021/232305
PCT Pub. Date: Nov. 25, 2021

(65) Prior Publication Data
US 2023/0225004 A1 Jul. 13, 2023

(51) Int. Cl.
*H04W 76/30* (2018.01)
*H04L 1/1867* (2023.01)
*H04W 74/0833* (2024.01)

(52) U.S. Cl.
CPC ............. *H04W 76/30* (2018.02); *H04L 1/189* (2013.01); *H04W 74/0833* (2013.01)

(58) Field of Classification Search
CPC .... H04W 76/30; H04W 74/0833; H04L 1/189
See application file for complete search history.

(56) References Cited

U.S. PATENT DOCUMENTS

| | | | |
|---|---|---|---|
| 2018/0270871 A1 | 9/2018 | Mallick et al. | |
| 2019/0289661 A1 | 9/2019 | Chen | |
| 2019/0320316 A1 | 10/2019 | Mildh et al. | |
| 2020/0077463 A1 | 3/2020 | Hong | |
| 2021/0211994 A1* | 7/2021 | Shih .................... | H04W 80/02 |

(Continued)

FOREIGN PATENT DOCUMENTS

| | | |
|---|---|---|
| CN | 110139365 A | 8/2019 |
| CN | 111095973 A | 5/2020 |
| JP | 2020-027955 A | 2/2020 |

(Continued)

OTHER PUBLICATIONS

JP Office Communication for JP Application No. 2022-570694, mailed on Mar. 12, 2024 with English Translation.

(Continued)

*Primary Examiner* — Duc C Ho
(74) *Attorney, Agent, or Firm* — Sughrue Mion, PLLC

(57) ABSTRACT

Embodiments of the present disclosure relate to methods, devices and computer readable media for communications. A method for communications implemented by a terminal device comprises in response to receiving, at a terminal device from a network device, a message indicating that the terminal device is to enter an inactive state, entering the inactive state. The message comprises a resource configuration for data transmission between the terminal device and the network device. The method further comprises performing the data transmission based on the resource configuration.

10 Claims, 6 Drawing Sheets

700

710

PERFORMING A TRANSMISSION, WHILE REMAINING IN AN ACTIVE STATE, IN A SMALL DATA TRANSMISSION (SDT) PROCEDURE

720

RECEIVING AN INTEGRITY CHECK FAILURE INDICATION FROM LOWER LAYERS WHILE THE SDT PROCEDURE IS ONGOING, DETECTING THAT A MAXIMUM NUMBER OF RLC RETRANSMISSIONS HAS BEEN REACHED WHILE THE SDT PROCEDURE IS ONGOING, OR DETECTING A RANDOM ACCESS PROBLEM WHILE THE SDT PROCEDURE IS ONGOING; AND

730

GOING TO AN IDLE STATE FROM THE INACTIVE STATE

(56)        References Cited

U.S. PATENT DOCUMENTS

| 2022/0095410 | A1* | 3/2022 | Shih | ................. H04W 74/0833 |
| 2023/0011624 | A1 | 1/2023 | Jiang | |

FOREIGN PATENT DOCUMENTS

| WO | 2018/062499 | A1 | 4/2018 |
| WO | 2018/228364 | A1 | 12/2018 |
| WO | 2019/063023 | A1 | 4/2019 |
| WO | 2021/189462 | A1 | 9/2021 |
| WO | 2021/228197 | A1 | 11/2021 |

OTHER PUBLICATIONS

"Timer based state transition from Connected to Inactive", Huawei, HiSilicon, 3GPP TSG-RAN WG2 Meeting 103bis, R2-1815317, Oct. 8-12, 2018, pp. 1-4.

International Search Report for PCT/CN2020/091364 dated Feb. 22, 2021 [PCT/ISA/210].

Written Opinion for PCT/CN2020/091364 dated Feb. 22, 2021 [PCT/ISA/237].

Huawei, Hisilicon, "Rel-17 work scope on IoT and MTC," 3GPP Draft TSG RAN Meeting #84, Jun. 3-6, 2019, RP-191008 (27 pages total).

Huawei, Hisilicon, "State Transitions," 3GPP TSG-RAN WG2 Meeting #96, Nov. 14-18, 2016, R2-168560 (3 pages total).

Communication dated Aug. 3, 2023 issued by the European Patent Office in application No. 20936799.4.

Office Action issued Oct. 31, 2023 in Japanese Application No. 2022-570694.

ZTE Corporation, "Summary of small data enhancements for NR Rel-17—Phase 2", 3GPP TSG-RAN Meeting #86, RP-192574, Dec. 8-12, 2019, Sitges, Spain (37 pages total).

* cited by examiner

700

710

PERFORMING A TRANSMISSION, WHILE REMAINING IN AN ACTIVE STATE, IN A SMALL DATA TRANSMISSION (SDT) PROCEDURE

↓

720

RECEIVING AN INTEGRITY CHECK FAILURE INDICATION FROM LOWER LAYERS WHILE THE SDT PROCEDURE IS ONGOING, DETECTING THAT A MAXIMUM NUMBER OF RLC RETRANSMISSIONS HAS BEEN REACHED WHILE THE SDT PROCEDURE IS ONGOING , OR DETECTING A RANDOM ACCESS PROBLEM WHILE THE SDT PROCEDURE IS ONGOING; AND

↓

730

GOING TO AN IDLE STATE FROM THE INACTIVE STATE

COMMUNICATING WITH A TERMINAL DEVICE; AND;
RECEIVING, A TRANSMISSION FROM A TERMINAL DEVICE
IN A SMALL DATA TRANSMISSION (SDT) PROCEDURE,
WHILE THE TERMINAL DEVICE IS REMAINING IN AN
INACTIVE STATE

↓             820

AN INTEGRITY CHECK FAILURE INDICATION IS RECEIVED
BY THE TERMINAL DEVICE FROM LOWER LAYERS WHILE
THE SDT PROCEDURE IS ONGOING, A MAXIMUM NUMBER
OF RLC RETRANSMISSIONS HAVING BEEN REACHED IS
DETECTED BY THE TERMINAL DEVICE WHILE THE SDT
PROCEDURE IS ONGOING, OR A RANDOM ACCESS PROBLEM
IS DETECTED BY THE TERMINAL DEVICE WHILE THE SDT
PROCEDURE IS ONGOING, AND

↓             830

A STATE TRANSITION TO AN IDLE STATE FROM THE
INACTIVE STATE IS PERFORMED BY THE TERMINAL DEVICE

Fig. 8

METHOD, DEVICE AND COMPUTER READABLE MEDIUM FOR COMMUNICATIONS

CROSS REFERENCE TO RELATED APPLICATIONS

This application is a National Stage of International Application No. PCT/CN2020/091364 filed May 20, 2020.

TECHNICAL FIELD

Embodiments of the present disclosure generally relate to the field of telecommunication, and in particular, to methods, devices and computer readable media for data transmission in an inactive state.

BACKGROUND

Typically, a terminal device in an inactive state may still have small and infrequent data traffic to be transmitted. Until the third generation partnership project (3GPP) Release 16, the inactive state cannot support data transmission, and the terminal device has to resume the connection for any downlink and uplink data transmission. Connection setup and subsequently release to the inactive state happens for each data transmission whatever small and infrequent the data packets are. This will result in unnecessary power consumption and signaling overhead.

In this event, 3GPP Release 17 has approved the small and infrequent data traffic based on a random access channel (RACH) and pre-configured physical uplink shared channel (PUSCH) resources in the inactive state. Thus, how to perform transmission of the small and infrequent data traffic has become a hot issue.

SUMMARY

In general, embodiments of the present disclosure provide methods, devices and computer readable media for data transmission in an inactive state.

In a first aspect, there is provided a method for communications. The method comprises in response to receiving, at a terminal device from a network device, a message indicating that the terminal device is to enter an inactive state, entering the inactive state. The message comprises a resource configuration for data transmission between the terminal device and the network device. The method further comprises performing the data transmission based on the resource configuration.

In a second aspect, there is provided a method for communications. The method comprises transmitting, from a network device to a terminal device, a message indicating that the terminal device is to enter an inactive state. The message comprises a resource configuration for data transmission between the terminal device and the network device. The method further comprises performing the data transmission based on the resource configuration.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 7 illustrates an example method for communication performed by a terminal device in accordance with some embodiments of the present disclosure; and FIG. 8 illustrates an example method for communication performed by a base station in accordance with some embodiments of the present disclosure.

Throughout the drawings, the same or similar reference numerals represent the same or similar element.

DETAILED DESCRIPTION

Figure 1:
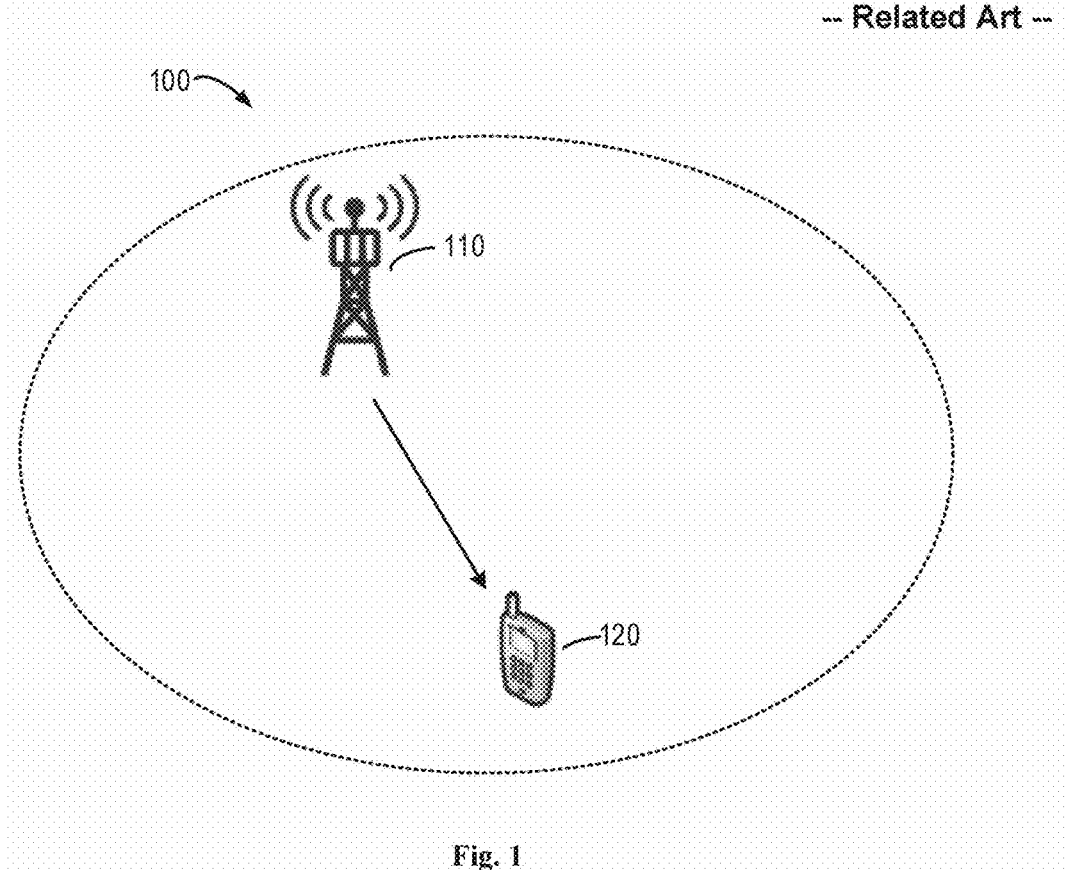
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities.

Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

FIG. 1 illustrates a schematic diagram of an example communication network 100 in which embodiments of the present disclosure can be implemented. As shown in FIG. 1, the communication network 100 may include a network device 110 and a terminal device 120 served by the network device 110. The network device 110 and the terminal device 120 may communicate with each other via a channel such as a wireless communication channel. For example, the terminal device 120 may transmit uplink data to the network device 110, and the network device 110 may transmit a response to reception of the uplink data to the terminal device 120.

It is to be understood that the number and type of devices in FIG. 1 are given for the purpose of illustration without suggesting any limitations to the present disclosure. The communication network 100 may include any suitable number of network devices and/or terminal devices adapted for implementing implementations of the present disclosure. Further, the communication network 100 may include any other devices than the network devices and the terminal devices, such as a core network element, but they are omitted here so as to avoid obscuring the present invention.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As mentioned above, the terminal device 120 in an inactive state may still have small and infrequent data traffic to be transmitted. This kind of data transmission is also referred to as small data transmission (SDT) hereinafter. In some embodiments, the small and infrequent data traffic may include smartphone applications such as traffic from instant messaging (IM) services (whatsapp, QQ, wechat etc.), heartbeat/keep-alive traffic from IM/email clients and other applications, and push notifications from various applications. In some embodiments, the small and infrequent data traffic may include non-smartphone applications such as traffic from wearables (periodic positioning information etc.), sensors (Industrial Wireless Sensor Networks transmitting temperature, pressure readings periodically or in an event triggered manner etc.), and smart meters and smart meter networks sending periodic meter readings.

Currently, a RACH-based scheme and transmission on pre-configured PUSCH have been approved to perform SDT in an inactive of a terminal device. However, no further detailed solutions on general procedure for SDT are proposed. Embodiments of the present disclosure provide a solution for SDT. With the solution in accordance with embodiments of the present disclosure, SDT is achieved. Principles and implementations of the present disclosure will be described in detail below with reference to the figures.

Figure 2:
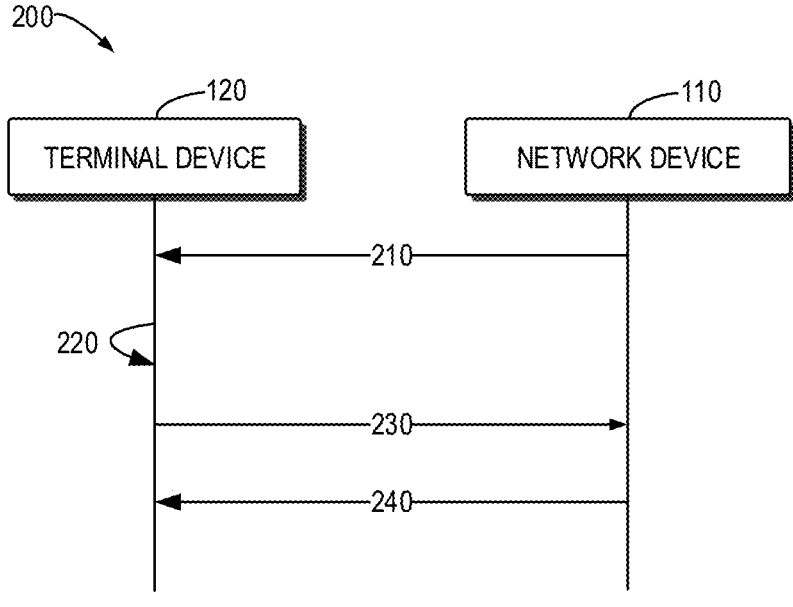
FIG. 2 illustrates an example signaling chart showing an example process for data transmission in an inactive state in accordance with some embodiments of the present disclosure.

FIG. 2 illustrates an example signaling chart showing an example process 200 for data transmission in an inactive state in accordance with some embodiments of the present disclosure. For the purpose of discussion, the process 200 will be described with reference to FIG. 1. The process 200 may involve the terminal device 120 and the network device 110 as illustrated in FIG. 1.

If the terminal device 120 receives 210 a message from the network device 110, the terminal device 120 enters 220 the inactive state. The message indicates that the terminal device 120 is to enter an inactive state. The message comprises a resource configuration for data transmission between the terminal device 120 and the network device 110.

In the inactive state, the terminal device 120 performs the data transmission based on the resource configuration. In some embodiments, upon entering the inactive state, the terminal device 120 transmits 230 uplink data to the network device 110 based on the resource configuration. In some embodiments, upon entering the inactive state, the terminal device 120 may receive 240 downlink data from the network device 110 based on the resource configuration.

In accordance with embodiments of the present disclosure, a general procedure for data transmission in the inactive state is provided.

In some embodiments, before receiving the message, the terminal device 120 is in a connected state. In such embodiments, upon receiving the message, the terminal device 120 transitions from the connected state to the inactive state.

In some embodiments, the message may comprise a Radio Resource Control (RRC) Release message. Of course, other messages than the RRC Release message may be applied. The scope of the present disclosure is not limited thereto.

In some embodiments, the message may further comprise a suspend configuration for the inactive state.

In some embodiments, the suspend configuration may comprise at least one of the following: a full Inactive-Radio Network Temporary Identifier (I-RNTI) of the terminal device 120, a short I-RNTI of the terminal device 120, a Paging Cycle, RAN-Notification Area Information, a Periodic RNAU-Timer Value, or a Next Hop Chaining Count.

Conventionally, upon receiving the message with the suspend configuration, UE performs the following actions: applying the received suspend configuration; removing all the entries within VarConditionalConfig (if any); resetting medium access control (MAC) and releasing the default MAC Cell Group configuration (if any); re-establishing radio link control (RLC) entities for signalling radio bearer 1 (SRB1); suspending all SRB(s) and data radio bearer(s) (DRB(s)), except SRB0; indicating packet data convergence protocol (PDCP) suspend to lower layers of all DRBs; indicating the suspension of the RRC connection to upper layers; entering RRC_INACTIVE and perform cell selection as specified in TS 38.304.

However, when receiving the RRC Release message with the suspend configuration, the reset of MAC will lead to timing advance (TA) invalid, which lead to subsequent SDT is not able to be performed. Thus, if the RRC Release message with the suspend configuration includes the resource configuration for the data transmission, the procedure should be different from conventional one.

In this regard, in some embodiments, upon receiving the message comprising the suspend configuration and the resource configuration for the data transmission, the terminal device 120 maintains a state of a MAC entity at the terminal device 120. In other words, the terminal device 120 does not reset the MAC entity.

In some embodiments, upon receiving the message comprising the suspend configuration and the resource configuration for the data transmission, the terminal device 120 maintains DRBs for the data transmission. In other words, the terminal device 120 does not suspend the DRBs for the data transmission.

In some embodiments, upon receiving the message comprising the suspend configuration and the resource configuration for the data transmission, the terminal device 120 maintains a state of a PDCP entity at the terminal device 120. In other words, the terminal device 120 does not suspend the PDCP entity.

In some embodiments, upon receiving the message comprising the suspend configuration and the resource configuration for the data transmission, the terminal device 120 suspends all SRB(s), except SRB0.

In some embodiments, the message from the network device 110 further comprises a configuration for an active bandwidth part (BWP) other than an initial BWP for the terminal device 120. In such embodiments, the terminal device 120 may perform the data transmission on the active BWP other than the initial BWP.

Figure 3:
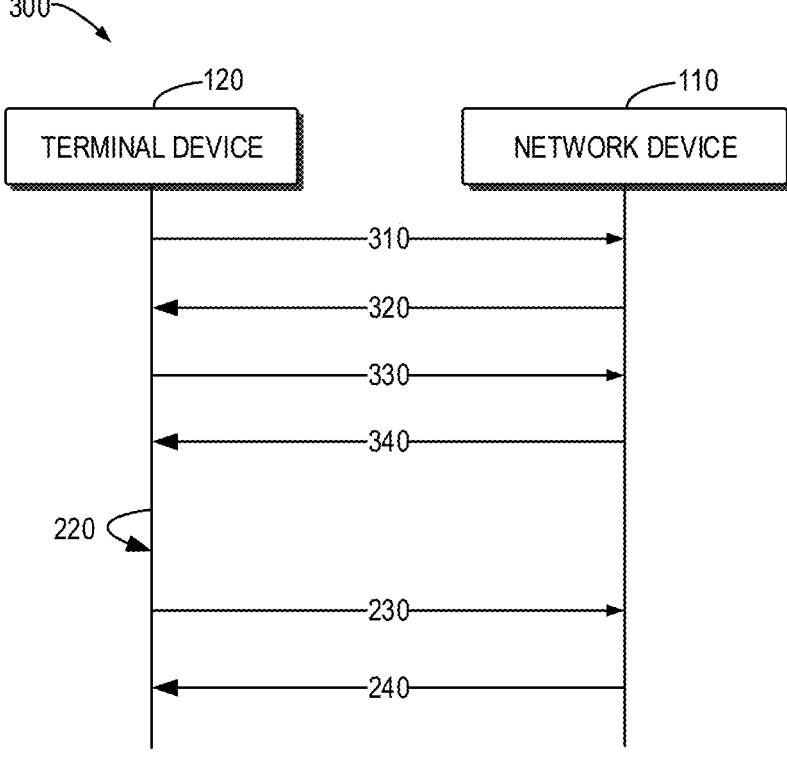
FIG. 3 illustrates an example signaling chart showing an example process for data transmission in an inactive state in accordance with other embodiments of the present disclosure.

FIG. 3 illustrates an example signaling chart showing an example process 300 for data transmission in an inactive state in accordance with other embodiments of the present disclosure. For the purpose of discussion, the process 300 will be described with reference to FIG. 1. The process 300 may involve the terminal device 120 and the network device 110 as illustrated in FIG. 1. The process 300 may relate to SDT based on RACH scheme and subsequent SDT.

The terminal device 120 in the inactive state transmits 310 a random access preamble to the network device 110. Upon receiving the random access preamble, the network device 110 transmits 320 a random access response to the terminal device 120.

The terminal device 120 transmits 330 a request for maintaining in the inactive state to the network device 110. In some embodiments, the terminal device 120 transmits the request and uplink data together to the network device 110.

In some embodiments, the request may comprise an RRC Resume Request or RRC Resume Request 1.

The network device 110 transmits 340 a message to the terminal device 120. The message indicates that the terminal device 120 is to enter an inactive state. The message comprises a resource configuration for data transmission. Different from the message transmitted at 210 in the process 200, the message transmitted at 340 may be transmitted with downlink data.

Similar to the process 200, if the terminal device 120 receives the message, the terminal device 120 enters 220 the inactive state. In the inactive state, the terminal device 120 transmits 230 uplink data to the network device 110 based on the resource configuration. In some embodiments, upon entering the inactive state, the terminal device 120 receives 240 downlink data from the network device 110 based on the resource configuration.

It should be understood that although the process 300 has been described by taking four-step random access procedure, the process 300 is also applied to two-step random access procedure.

Conventionally, radio link monitoring and radio link failure (RLF) detection are only supported for a terminal device in a connected state.

In the connected state, the terminal device performs Radio Link Monitoring (RLM) in the active BWP based on reference signals and signal quality thresholds configured by the network device. The reference signals may comprise at least one of Synchronization Signal Block (SSB) or channel state information reference signal (CSI-RS). SSB-based RLM is based on the SSB associated to the initial DL BWP and can only be configured for the initial DL BWP and for DL BWPs containing the SSB associated to the initial DL BWP.

For other DL BWPs, RLM can only be performed based on CSI-RS. In case of DAPS handover, the terminal device continues the RLM at the source cell until the successful completion of the random access procedure to the target cell.

The terminal device declares Radio Link Failure (RLF) when one of the following criteria are met: expiry of a radio problem timer started after indication of radio problems from the physical layer (if radio problems are recovered before the timer is expired, the terminal device stops the timer); or expiry of a timer started upon triggering a measurement report for a measurement identity for which the timer has been configured while another radio problem timer is running; or Random access procedure failure; or RLC failure; or Random access procedure failure; or after detection of consistent uplink listen before talk (LBT) failures for operation with shared spectrum channel access.

Conventionally, after RLF is declared, the terminal device may perform at least one of the following: staying in the connected state; selecting a suitable cell and then initiating RRC re-establishment; entering an idle state if a suitable cell was not found within a certain time after RLF was declared.

During the SDT in the inactive state, there may be gap between coverage for cell reselection and coverage for data transmission, which means the radio signal has become too weak to transmit data successfully, but cell reselection still does not happen yet. If the terminal device still keeps SDT, significant delay would be introduced. Thus, In order to solve the above problem, RLF related handling for the terminal device performing SDT in the inactive state is proposed.

In some embodiments, the terminal device 120 detects an RLF during the data transmission in the inactive state.

In some embodiments, the terminal device 120 detects the RLF and declares the RLF when one of the following criteria are met: expiry of a radio problem timer started after indication of radio problems from the physical layer (upon T310 expiry in PSCell); or RLC failure (i.e., the maximum number of retransmissions has been reached); or Random access procedure failure; or consistent LBT failure.

In some embodiments, the terminal device 120 detects the radio problems by performing RLM in the active BWP

8

In some embodiments, in order to initiate the connection resumption procedure, the terminal device 120 transmits to the network device 110 a request for resuming a first RRC connection between the terminal device 120 and the network device 110. In some embodiments, the terminal device 120 transmits to the network device 110 the request without uplink data.

In some embodiments, upon detecting the RLF, the terminal device 120 mitigates the RLF by resetting MAC entity.

In some embodiments, upon detecting the RLF, the terminal device 120 mitigates the RLF by suspending all DRBs.

In some embodiments, upon detecting the RLF, the terminal device 120 mitigates the RLF by entering an idle state.

In some embodiments, the terminal device 120 enters the idle state by releasing the resource configuration received from the network device 110.

In accordance with some embodiments of the present disclosure, with radio link monitoring and RLF detection during the data transmission, the radio link problem can be detected when performing SDT in the inactive state, the terminal device can perform procedure to avoid service interruption.

Currently, when a terminal device going to an RRC idle state, three types of release causes can be provided to the upper layer, i.e. "other", "RRC Connection failure" and "RRC Resume failure". However, all these three release causes are not suitable for SDT failure.

In some embodiments, upon entering the idle state, the terminal device 120 provides an indication to a non-access stratum (NAS). The indication indicates a failure of the data transmission in the inactive state. Hereinafter, the indication is also referred to as a release cause. The failure of the data transmission is also referred to as SDT failure.

In some embodiments, if a timer T319 expires or upon receiving Integrity check failure indication from lower layers while the timer T319 is running, and if the RRC Resume procedure is initiated for SDT, the terminal device 120 performs the actions upon entering the idle state, with release cause which indicates "SDT failure".

Table 1 shows details about the timer T319.

TABLE 1

| Timer | Start | Stop | At expiry |
|-------|-------|------|-----------|
| T319 | Upon transmission of RRCResumeRequest or RRCResumeRequest1. | Upon reception of RRCResume, RRCSetup, RRCRelease, RRCRelease with suspendConfig or RRCReject message, cell re-selection and upon abortion of connection establishment by upper layers. | Perform the actions as specified in TS 38.331, Section 5.3.13.5. | based on reference signals (such as SSB or CSI-RS) and signal quality thresholds configured by the network device 110.

In some embodiments, upon detecting the RLF, the terminal device 120 mitigates the RLF by initiating a connection resumption procedure to the network device 110.

In some embodiments, if cell reselection occurs while the timer T319 or a timer T302 is running, and if the RRC Resume procedure is initiated for SDT, the terminal device 120 performs the actions upon entering the idle state, with release cause which indicates "SDT failure".

Table 2 shows details about the timer T302.

TABLE 2

| Timer | Start | Stop | At expiry |
|-------|-------|------|-----------|
| T302 | Upon reception of RRCReject while performing | Upon entering RRC_CONNECTED or RRC_IDLE, upon cell re-selection | Inform upper layers about barring |

TABLE 2-continued

| Timer | Start | Stop | At expiry |
|---|---|---|---|
| | RRC connection establishment or resume, upon reception of RRCRelease with waitTime. | and upon reception of RRCReject message. | alleviation as specified in TS 38.331, Section 5.3.14.4 |

In some embodiments, upon detecting the RLF during subsequent SDT or configured grant SDT, the terminal device 120 performs the actions upon entering the idle state, with release cause which indicates "SDT failure".

In accordance with some embodiments of the present disclosure, with the release cause which indicates "SDT failure" being provided to the NAS, the NAS layer can transfer form Connection Management (CM)-Connected-state to CM-Idle state, with the reason of the state transition.

Figure 4:
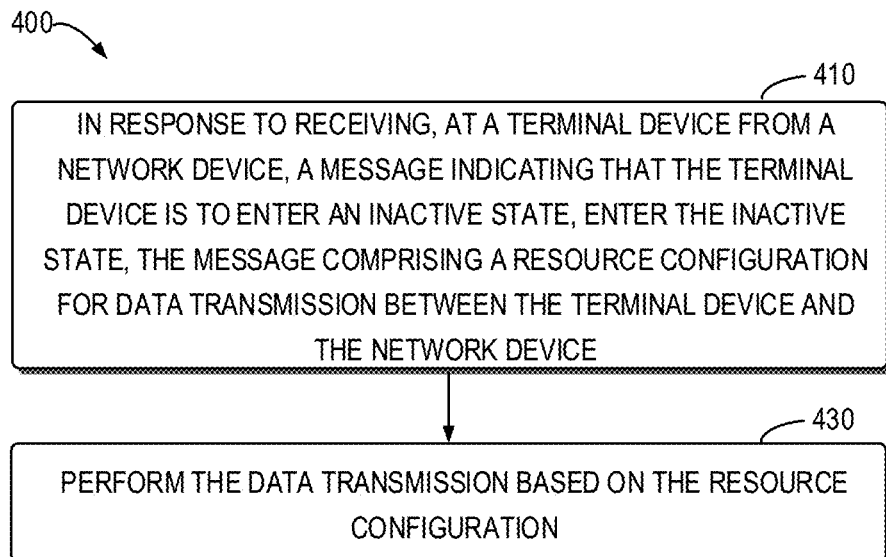
FIG. 4 illustrates an example method for communications implemented at a terminal device in accordance with some embodiments of the present disclosure.

FIG. 4 illustrates an example method 400 for communications implemented at a terminal device in accordance with some embodiments of the present disclosure. For example, the method 400 may be performed at the terminal device 120 as shown in FIG. 1. For the purpose of discussion, in the following, the method 400 will be described with reference to FIG. 1. It is to be understood that the method 400 may include additional blocks not shown and/or may omit some blocks as shown, and the scope of the present disclosure is not limited in this regard.

At block 410, if the terminal device 120 receives from the network device 110 a message indicating that the terminal device 120 is to enter an inactive state, the terminal device 120 enters the inactive state. The message comprises a resource configuration for data transmission between the terminal device and the network device.

At block 420, the terminal device 120 performs the data transmission based on the resource configuration.

In some embodiments, the terminal device 120 is in a connected state before receiving the message, and entering the inactive state comprises transitioning from the connected state to the inactive state.

In some embodiments, a state of a medium access control entity at the terminal device is maintained.

In some embodiments, data radio bearers for the data transmission are maintained.

In some embodiments, a state of a packet data convergence protocol entity at the terminal device is maintained.

In some embodiments, the message further comprises a configuration for an active bandwidth part other than an initial bandwidth part for the terminal device; and performing the data transmission comprises performing the data transmission on the active bandwidth part.

In some embodiments, the method 400 further comprises detecting a radio link failure during the data transmission in the inactive state.

In some embodiments, the method 400 further comprises in response to detecting the radio link failure, mitigating the radio link failure by initiating a connection resumption procedure to the network device.

In some embodiments, initiating the connection resumption procedure comprises: transmitting to the network device a request for resuming a first radio resource control connection between the terminal device and the network device.

In some embodiments, transmitting the request comprises transmitting the request without the uplink data.

In some embodiments, the method 400 further comprises in response to detecting the radio link failure, mitigating the radio link failure by entering an idle state.

In some embodiments, the method 400 further comprises entering an idle state in response to at least one of the following: an expiry of a timer T319, receiving an integrity check failure indication from lower layers while the timer T319 is running, or cell reselection occurring while the timer T319 or a timer T302 is running.

In some embodiments, entering the idle state comprises releasing the resource configuration.

In some embodiments, the method 400 further comprises providing to a non-access stratum an indication indicating a failure of the data transmission in the inactive state.

Figure 5:
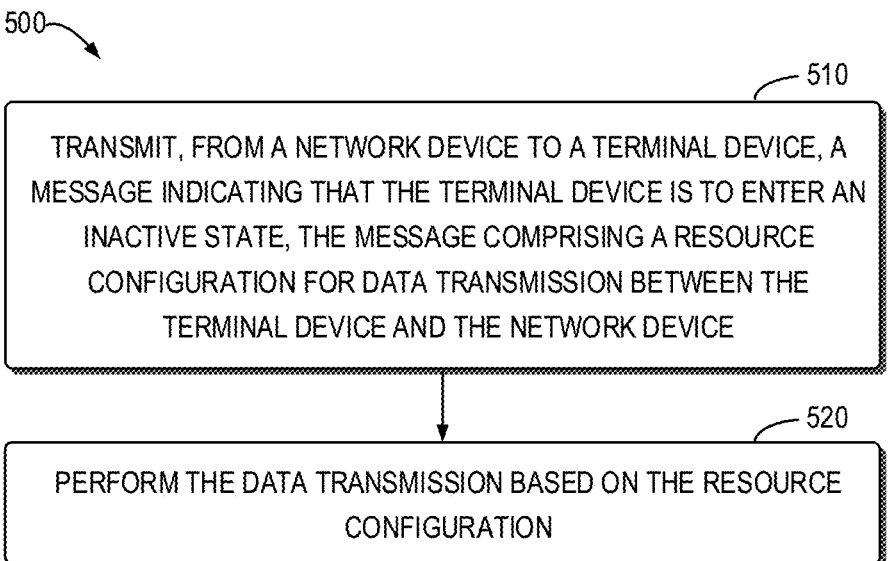
FIG. 5 illustrates an example method for communications implemented at a network device in accordance with some embodiments of the present disclosure.

FIG. 5 illustrates an example method 500 for communications implemented at a network device in accordance with some embodiments of the present disclosure. For example, the method 500 may be performed at the network device 110 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard.

At block 510, the network device 110 transmits to the terminal device 120 a message indicating that the terminal device is to enter an inactive state. The message comprises a resource configuration for data transmission between the terminal device and the network device.

At block 520, the network device 110 performs the data transmission based on the resource configuration.

In some embodiments, the message further comprises a configuration for an active bandwidth part other than an initial bandwidth part for the terminal device; and performing the data transmission comprises performing the data transmission on the active bandwidth part.

In some embodiments, the method 500 further comprises: in response to a radio link failure during the data transmission in the inactive state, receiving, from the terminal device, a request for resuming a first radio resource control connection between the terminal device and the network device.

In some embodiments, receiving the request comprises receiving the request without uplink data.

Figure 6:
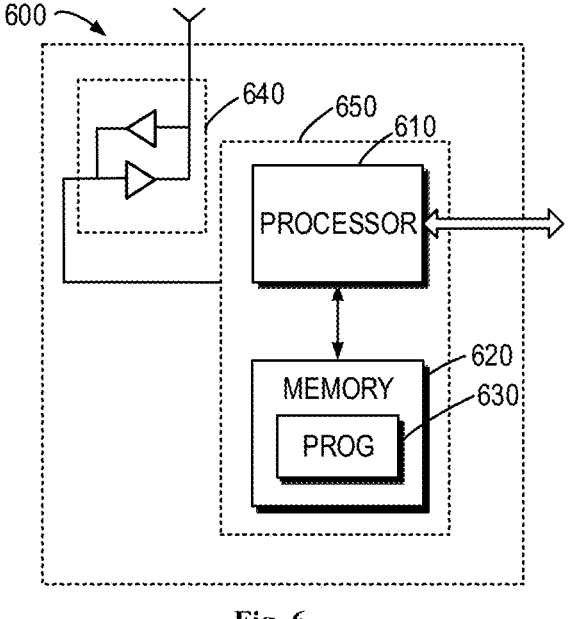
FIG. 6 is a simplified block diagram of a device that is suitable for implementing embodiments of the present disclosure.

FIG. 6 is a simplified block diagram of a device 600 that is suitable for implementing embodiments of the present disclosure. The device 600 can be considered as a further example implementation of the network device 110 or the terminal device 120 as shown in FIG. 1. Accordingly, the device 600 can be implemented at or as at least a part of the network device 110 or the terminal device 120.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 620 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 630 is assumed to include program instructions that, when executed by the associated processor 610, enable the device 600 to operate in accordance with the embodiments of the present disclosure, as discussed herein with reference to FIGS. 1 to 5. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 620 may form processing means 650 adapted to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

FIG. 7 illustrates an example method 700 for communication performed by a terminal device in accordance with some embodiments of the present disclosure. For example, the method 700 may be performed at the terminal device 120 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

At block 710, the terminal device 120 performs a transmission, while remaining in an inactive state, in a Small Data Transmission (SDT) procedure.

At block 720, the terminal device 120 receives an Integrity check failure indication from lower layers while the SDT procedure is ongoing, detecting that a maximum number of RLC retransmissions has been reached while the SDT procedure is ongoing, or detecting a random access problem while the SDT procedure is ongoing.

At block 730, the terminal device 120 goes to an idle state from the inactive state.

FIG. 8 illustrates an example method 800 for communication performed by a base station in accordance with some embodiments of the present disclosure. For example, the method 800 may be performed at the network device 110 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard.

At block 810, the network device 110 communicates with a terminal device.

At block 820, the network device 110 receives, a transmission from a terminal device in a Small Data Transmission (SDT) procedure, while the terminal device is remaining in an inactive state.

At block 830, an Integrity check failure indication is received by the terminal device from lower layers while the SDT procedure is ongoing, a maximum number of RLC retransmissions having been reached is detected by the terminal device while the SDT procedure is ongoing, or a random access problem is detected by the terminal device while the SDT procedure is ongoing.

At block 840, a state transition to an idle state from the inactive state is performed by the terminal device.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote readable media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device.

The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication performed by a terminal device, the method comprising:

performing a transmission, while remaining in an inactive state, in a Small Data Transmission (SDT) procedure;

receiving an Integrity check failure indication from lower layers while the SDT procedure is ongoing, detecting that a maximum number of RLC retransmissions has been reached while the SDT procedure is ongoing, or detecting a random access problem while the SDT procedure is ongoing; and going to an idle state from the inactive state.

2. The method of claim 1, wherein the terminal device goes to the idle state with a release cause indicating a failure.

3. The method of claim 2, wherein the release cause indicates the failure in an RRC Resume procedure.

4. The method of claim 1, wherein the SDT procedure is based on a Random Access Channel (RACH) scheme.

5. The method of claim 1, wherein the SDT procedure is related to subsequent SDT.

6. A method for communication performed by a base station, the method comprising:

communicating with a terminal device; and receiving, a transmission from a terminal device in a Small Data Transmission (SDT) procedure, while the terminal device is remaining in an inactive state, wherein, an Integrity check failure indication is received by the terminal device from lower layers while the SDT procedure is ongoing, a maximum number of RLC retransmissions having been reached is detected by the terminal device while the SDT procedure is ongoing, or a random access problem is detected by the terminal device while the SDT procedure is ongoing, and wherein a state transition to an idle state from the inactive state is performed by the terminal device.

7. The method of claim 6, wherein the state transition is performed with a release cause indicating a failure.

8. The method of claim 7, wherein the release cause indicates the failure in an RRC Resume procedure.

9. The method of claim 6, wherein the SDT procedure is based on a Random Access Channel (RACH) scheme.

10. The method of claim 6, wherein the SDT procedure is related to subsequent SDT.

* * * * *